3,268,523
DERIVATIVES OF CEPHALOSPORANIC ACID
Rintje Raap, Raymond Urgel Lemieux, and Ronald George Micetich, Edmonton, Alberta, Canada, assignors to R & L Molecular Research Ltd., Edmonton, Alberta, Canada
No Drawing. Filed June 28, 1965, Ser. No. 467,686
20 Claims. (Cl. 260—243)

This invention relates to new synthetic compounds of value as antibacterial agents, as nutritional supplements in animal feeds, as agents for the treatment of mastitis in cattle, and as therapeutic agents in poultry and animals, including man, in the treatment of infectious diseases caused by Gram-positive bacteria and, more particularly, relates to novel 7-isothiazolylacetamido cephalosporanic acids.

Antibacterial agents of the penicillin class have proven highly effective in the therapy of infections due to Gram-positive bacteria but nearly all such penicillins are ineffective against numerous so-called resistant strains of bacteria, e.g. benzylpenicillin-resistant strains of *Staphylococcus aureus* (*Micrococcus pyogenes* var. *aureus*) and Gram-negative bacteria, e.g. *Salmonella enteritidis* and *Klebsiella pneumoniae*. It is the object of the present invention to provide novel compounds which are effective against both Gram-positive and Gram-negative bacteria including the resistant strains. It is a further object of the present invention to provide cephalosporins active against Gram-positive and Gram-negative bacteria which are efficiently absorbed upon oral administration to man and animals.

The objects of the present invention have been achieved by the provision, according to the present invention, of a compound of the formula (I)
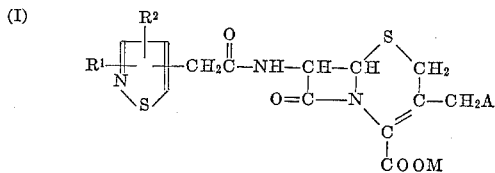
COOM wherein
A is a member selected from the group consisting of hydrogen, hydroxyl, (lower)alkanoyloxy, containing 2–8 carbon atoms, e.g. acetoxy, propionoyloxy, butanoyloxy, pentanoyloxy, etc., benzoyloxy, a quaternary ammonium radical, e.g. pyridinium, quinolinium, picolinium, etc. and when taken together with M, a monovalent carbon-oxygen bond;
M is a member selected from the group consisting of hydrogen, a pharmaceutically acceptable nontoxic cation, an anionic charge when A is a quaternary ammonium radical, and when taken together with A, a monovalent carbon-oxygen bond;
$R^1$ and $R^2$ each represent a member selected from the group consisting of hydrogen, chloro, bromo, iodo and methyl.

For clarity, we have illustrated below the formulae of the compounds when in Formula I, A is a quaternary ammonium radical (pyridinium) and M is an anionic charge and when A and M together are a monovalent carbon-oxygen bond.

(II)
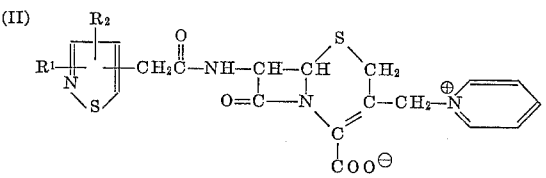

(III)
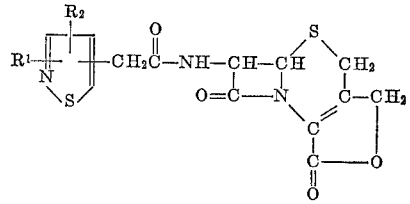

wherein $R^1$ and $R^2$ have the meaning set forth above.

The preferred embodiments of the present invention are the free acids and the salts thereof of which the free acids have the formulae (IV)
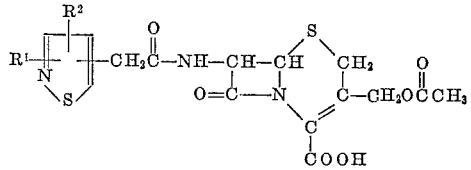

(V)
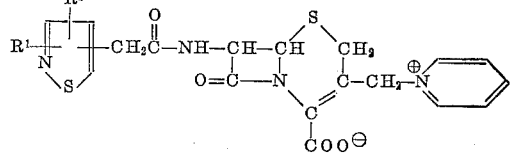

wherein $R^1$ and $R^2$ have the meaning set forth above.

Particularly advantageous embodiments of the present invention are those compounds wherein $R^1$ and $R^2$ each represent hydrogen or methyl.

The pharmaceutically acceptable cations represented include metallic cations such as sodium, potassium, calcium and aluminum and organic amine cations such as trialkylamines, e.g. triethylamine, procaine, dibenzylamine, N-benzyl-β-phenethylamine, 1-ephenamine, N,N′-dibenzylethylenediamine, dehydroabietylamine, N,N′-bis-dehydroabietylethylenediamine, N-(lower)alkylpiperidines, e.g. N-ethylpiperidine and other amines which have been used to form salts with benzylpenicillin.

The products of the present invention are prepared by the reaction of a compound of the formula (VI)
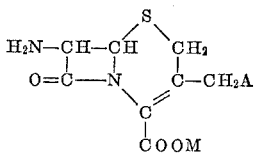
COOM wherein A and M are as described above, preferably in the form of a neutral salt such as the sodium salt or the triethylamine salt, i.e. when A is hydrogen, hydroxy, (lower)alkanoyloxy or benzoyloxy, with an active ester, e.g. 2,4-dinitrophenyl ester, or the p-nitrophenyl ester or N-hydroxysuccinimide ester of an acid having the formula (VII)
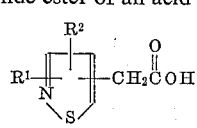

wherein $R^1$ and $R^2$ have the meaning set forth above, or with its functional equivalent as an acylating agent for a primary amino group. Such equivalents include the corresponding carboxylic chlorides, bromides, acid anhydrides, including mixed anhydrides and particularly the mixed anhydrides prepared from stronger acids such as the lower aliphatic monoesters of carbonic acid, of alkyl and aryl sulfonic acids and of more hindered acids such as diphenylacetic acid. In addition, an acid azide or active thioester (e.g. with thiophenol, thioacetic acid), may be used or the free acid itself may be coupled with the compound of Formula VI by the use of enzymes or of a carbodimide reagent [cf. Sheehan and Hess, J. Amer. Chem. Soc. 77, 1067 (1955)]. Another equivalent of the 2,4-dinitrophenyl and p-nitrophenyl esters is a corresponding azolide, i.e. an amide of the corresponding acid whose amide nitrogen is a member of a quasi-aromatic five-membered ring containing at least two nitrogen atoms, i.e. imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The by-product, imidazole, precipitates and may be separated and the imidazolide isolated, but this is not essential. The methods for carrying out these reactions to produce a cephalosporin and the methods used to isolate the cephalosporin so-produced are well-known in the art (cf. U.S. Patent Nos. 3,079,314, 3,117,126 and 3,129,224 and British Patent Nos. 932,644, 957,570 and 959,054).

The novel isothiazolylacetic acids used in the present invention having the formula (VIII)

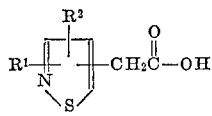

wherein $R^1$ and $R^2$ have the meaning set forth above, are preferably prepared as described and exemplified below from the corresponding isothiazole carboxylic acids or from the corresponding methylisothiazoles. Various isothiazoles, isothiazole carboxylic acids and/or methylisothiazoles and methods for their preparation thereof are described by Caton et al., J. Chem. Soc., 446 (1964); Hüberett et al., Angew Chem. International Edition 2, 714 (1963); Buttimore et al., J. Chem. Soc., 2032 (1963); Adams et al., J. Chem. Soc., 3061 (1959); Wille et al., Angew Chem. International Edition 1, 335 (1962); Goerdeler et al., Chem. Ber. 94, 2950 (1961); United States Patent No. 2,839,529 and British Patent No. 984,811.

The isothiazolylacetic acids are prepared from the corresponding isothiazole carboxylic acids according to the following reaction scheme:

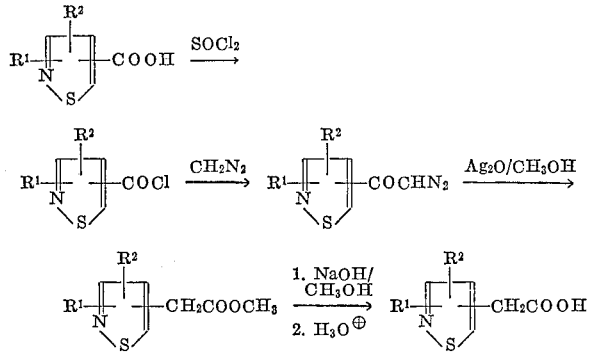

wherein $R^1$ and $R^2$ have the meaning set forth above.

In this process, an isothiazole carboxylic acid is reacted with thionyl chloride preferably at reflux temperature to from the acid chloride. Reaction of the acid chloride with diazomethane solution, e.g., an ethereal solution, preferably at about room temperature gives the diazomethylketone. The diazomethylketone is converted to the acetate by heating with an alcohol, e.g. methanol and ethanol, in the presence of silver oxide. The acetate is hydrolyzed to isothiazolylacetic acid by treating with an alcoholic solution of a strong base, e.g., sodium hydroxide in methanol preferably at room temperature and then acidifying with a strong acid, e.g., hydrochloric acid.

When methylisothiazoles are used to prepare the isothiazolylacetic acids, the reaction scheme is as follows:

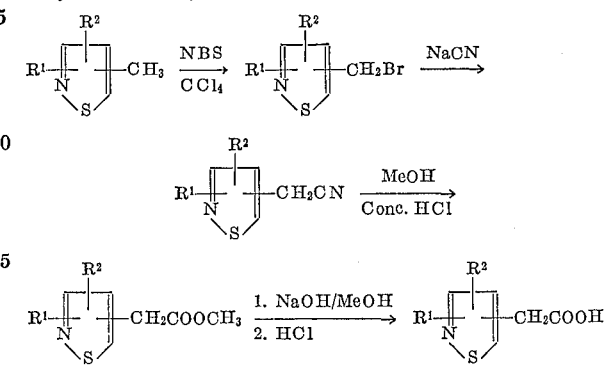

wherein $R^1$ and $R^2$ are each hydrogen, chloro, bromo, or iodo. Obviously where either or both of $R^1$ and $R^2$ is methyl, the first described method should be used.

In this process, a methylisothiazole is halogenated with a halogen radical source, e.g., N-bromosuccinimide or N-chlorosuccinimide, in the presence of a non-reactive solvent such as carbon tetrachloride and preferably at reflux temperature to produce a halomethylisothiazole, preferably a bromomethylisothiazole. Treatment of this compound with an alkali metal cyanide in the presence of a solvent, e.g., methanol-water, gives a mixture of the cyanide and the amide. The mixture is heated at reflux temperature with a strong acid, e.g., concentrated hydrochloric acid, and an alcohol, e.g., methanol or ethanol, to form the acetate. Hydrolysis of the acetate by treatment with an alcoholic solution of a strong base, e.g., sodium hydroxide in methanol, preferably at room temperature, followed by acidification with a strong acid, e.g., hydrochloric acid, produces the isothiazole carboxylic acid.

Alternatively, the isothiazolylacetic acids of this invention may be prepared from isothiazole lithium compounds [described by Caton et al., J. Chem. Soc., 446 (1964)] by the various reaction schemes which are described below:

(1) Reaction of isothiazole lithium with formaldehyde to give isothiazolylmethyl alcohol and then treatment with a halo acid, e.g. hydrochloric, hydrobromic or hydriodic, to form a halomethylisothiazole. The subsequent procedure whereby the acid is obtained is identical to that described for the preparation of isothiazole acetic acids from methylisothiazoles.

(2) Ethoxylation of isothiazole lithium with ethylene oxide to give isothiazolylethyl alcohol and subsequent oxidation to the acid.

(3) Reaction of isothiazole lithium with a haloacetate to form an isothiazolylacetate and subsequent hydrolysis to the acid.

(4) Reaction of isothiazole lithium with a dialkoxyethylhalide to form dialkoxyethylisothiazole; acidification with dilute acid to form the aldehyde; followed by oxidation to the acid.

(5) Reaction of isothiazole lithium with allyl halide to form allylisothiazole and then oxidation to the acid.

(6) Reaction of isothiazole lithium with dimethylformamide to give formylisothiazole [reaction described by Caton et al., J. Chem. Soc., 446 (1964)] followed by condensation with rhodanine to give isothiazolylrhodanine. The isothiazolylrhodanine is cleaved with alkali, e.g., sodium hydroxide, to give isothiazolyl α-thioketopropionic acid, which in turn is converted to the oximino acid with ammonium hydroxide. Decarboxylation and dehydration with acetic anhydride produces the cyanomethyl isothiazole which is converted to the acid by the procedure described in connection with the preparation of isothiazolylacetic acids from methylisothiazole. This general procedure is described by Plucker et al., J. Amer. Chem. Soc. 62. 1512 (1940).

In the foregoing reaction schemes, instead of the lithium compound, the corresponding Grignard compound, e.g. isothiazole magensium, bromide or iodide (prepared by reaction of bromo or iodo isothiazole with magnesium), can be used.

Additional procedures for the preparation of isothiazolylacetic acid are as follows:

(7) Reaction of halomethylisothiazole (preparation described above) with magnesium to form corresponding Grignard compound followed by treatment with carbon dioxide gives the acid.

(8) Conversion of isothiazole carboxylic acid to the acetic acid according to the Arndt-Eistert synthesis, or treatment of isothiazole carboxylic acid with lithium aluminum hydride to give isothiazolylmethyl alcohol, and subsequent conversion of the alcohol to the acid according to the procedure described in Scheme 7 above.

(9) Reaction of haloisothiazole with sodium dicyanomethane or sodium dialkylmalonate, e.g. sodium diethylmalonate, to give the corresponding dicyanomethylisothitazole or dicarbalkoxymethylisothiazole followed by acid hydrolysis to the acid.

The compounds of Formula VI used in the present invention include 7-aminocephalosporanic acid and derivatives of 7-aminocephalosporanic acid. 7-aminocephalosporanic acid is prepared by hydrolysis of cephalosporin C and has the formula (IX)

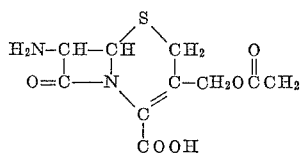

Acid hydrolysis of cephalosporin C to produce 7-aminocephalosporanic acid results in the coproduction of the lactone, 3-hydroxymethyl-7-aminodecephalosporanic acid lactone, formed by the further hydrolysis of the acetoxy group and subsequent internal esterification. The lactone has the formula (X)

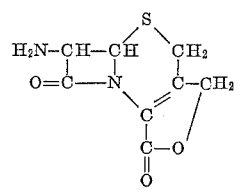

Enzymatic hydrolysis of the acetoxy group of 7-aminocephalosporanic acid results in the formation of 3-hydroxymethyl-7-aminodecephalosporanic acid having the formula (XI)

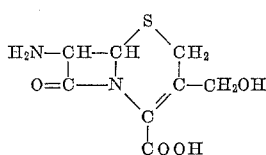

and such compound may be re-esterified with benzoic acid or a lower alkanoic acid, e.g. acetic acid, propionic acid and the like to form other esters. Preferably, re-esterification is carried out on a 3-hydroxymethyl-7-(isothiazolyl-acetamido)decephalosporanic acid which is obtained by enzymatic hydrolysis of a 7-(isothiazolylacetamido)cephalosporanic acid.

Treatment of cepaholsporin C with a tertiary amine, e.g. pyridine, quinoline, picoline and the like followed by acid hydrolysis produces a nucleus which, in the case of pyridine, has the formula (XII)

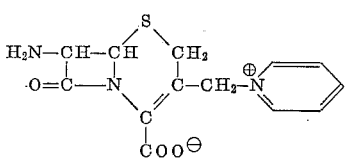

and has been given the name 3-pyridiniummethyl-7-aminodecephalosporanic acid imine salt.

The foregoing nuclei and the preparation thereof are known in the art and are described for example in U.S. Patent No. 3,117,126 and British Patent Nos. 932,644, 957,570 and 959,054.

3-methyl-7-aminodecephalosporanic acid having the formula (XIII)

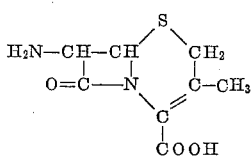

is produced by catalytic reduction of cephalosporin C followed by hydrolytic removal of the 5-aminoadipoyl side chain as described in U.S. Patent No. 3,129,224.

The following examples will serve to illustrate this invention without limiting it thereto. All temperatures are in degrees centigrade.

EXAMPLE 1

*Preparation of isothiazol-3-yl-acetic acid*

The synthesis of this acid is illustrated by the following scheme:

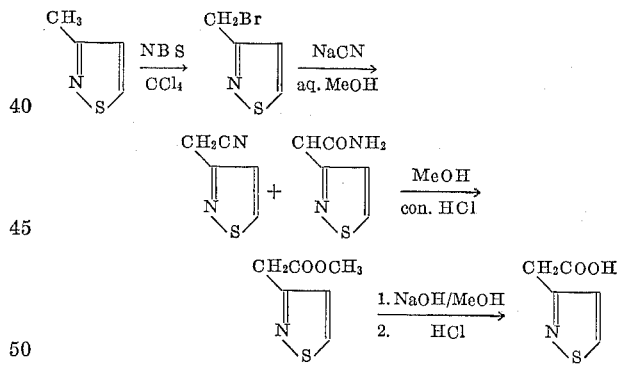

3-BROMOMETHYLISOTHIAZOLE 3-methylisothiazole (9.9 g., 0.10 mole) and N-bromosuccinimide (18 g., 0.10 mole) in dry carbon tetrachloride (250 ml.) were heated with vigorous stirring under reflux with exposure to a 750 watt lamp for 5–6 hours, at which time all the N-bromosuccinimide had been consumed. Succinimide was removed by filtration and the filtrate was concentrated on a steam bath. The residue was then subjected to fractional distillation in vacuo to give 7 g. (40%) of 3-bromomethylisothiazole, B.P. 58–60° (1.5 mm.).

3-CYANOMETHYLISOTHIAZOLE AND 3-CARBOX-AMIDOMETHYLISOTHIAZOLE 3-bromomethylisothiazole (22 g., 0.13 mole), sodium cyanide (9.8 g., 0.20 mole), methanol (60 ml.) and water (60 ml.) were heated under reflux for 5–6 hours, during which time the solution had attained a deep red color. After most of the methanol had been removed under reduced pressure the solution was saturated with salt and continuously extracted with ethyl acetate for 24 hours. The ethyl acetate solution was dried over magnesium sulfate and filtered. Removal of the solvent yielded 13.5 g. of a yellow semi-solid, a mixture of cyanide and amide as indicated by the infrared spectrum. Separation could be effected by washing with cold benzene, in which the cyanide dissolved and was recovered as an oil (7.0 g.) by removal of the solvent. The amide could be recrystallized from ethyl acetate-hexane to give long white needles (4.1 g.), M.P. 123–127°.

The crude mixture of cyanide and amide could be used as such in the preparation of methyl isothiazol-3-yl-acetate.

METHYL ISOTHIAZOL-3-YL-ACETATE

The mixture of cyanide and amide (16.5 g.) was heated under reflux for 4 hours with concentrated hydrochloric acid (50 ml.) and methanol (100 ml.). The methanol was removed under reduced pressure, the solution saturated with salt and extracted with ether (6 x 100 ml.). The combined ether extracts were dried over magnesium sulfate and filtered. The ether was removed and the residue distilled in vacuo to give 13 g. of methyl isothiazol-3-yl-acetate, B.P. 108–110° (6 mm.).

ISOTHIAZOL-3-YL-ACETIC ACID

Methyl isothiazol-3-yl-acetate (12.5 g.) was dissolved in methanol (15 ml.) and a solution of 3 N sodium hydroxide in methanol (30 ml.) was added with swirling. The color of the solution went from yellow to dark red. The solution was left overnight at room temperature and then concentrated in vacuo to a thick red wax. Excess dry ether was added with scratching and the sodium salt separated as fine pink needles. These were filtered, washed with dry ether and dried by suction. The salt was dissolved in ice water (100 ml.) and acidified with concentrated hydrochloric acid (8 ml.). The mixture was saturated with salt and extracted with ethyl acetate (5 x 100 ml.). The dried (MgSO$_4$) ethyl acetate extracts were filtered and the solvent was removed. The residue was recrystallized from ethyl acetate-hexane and 8.2 g. (71%) of isothiazol-3-yl-acetic acid was obtained as white needles, M.P. 130–132° (dec.).

The structural assignment of this acid was confirmed by the neutralization equivalent, the infrared spectrum and the nuclear magnetic resonance absorption spectrum.

EXAMPLE 2

*Preparation of isothiazol-4-yl-acetic acid*

The synthesis of this acid is schematically represented by:

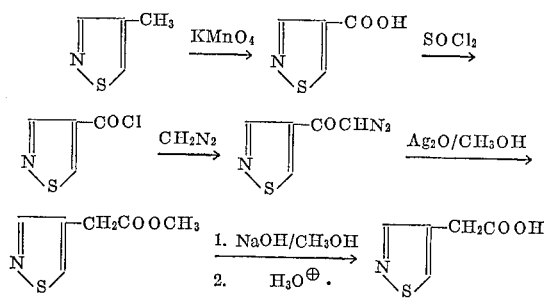

ISOTHIAZOLE-4-CARBOXYLIC ACID 4-methylisothiazole (22 g.), sodium carbonate (72 g.) and water (1 litre) were stirred vigorously and heated under reflux. An aqueous solution of potassium permanganate (300 g. in 2 litre) was added rapidly and the mixture was heated for an additional 20 minutes. The precipitated manganese dioxide was filtered and washed with hot water (4 x 100 ml.). The aqueous layer was extracted with ether (3 x 200 ml.) and carefully acidified with concentrated sulfuric acid to pH 1. The mixture was saturated with salt and continuously extracted with ether for 48 hours. The ether solution was dried (MgSO$_4$), filtered and the solvent removed under reduced pressure to give 6.0 g. (20%) yield of isothiazole-4-carboxylic acid. A portion was recrystallized from ethyl acetate-hexane and melted at 162–164°.

ISOTHIAZOLE-4-CARBONYL CHLORIDE

Crude isothiazole-4-carboxylic acid (6.0 g.) and thionyl chloride (70 ml.) were heated under reflux for two and one half hours, whereafter the excess of thionyl chloride was removed under reduced pressure. Distillation of the residue in vacuo gave 3 g. (44%) yield of isothiazole-4-carbonyl chloride, B.P. 73–74° (5 mm.).

ISOTHIAZOLE-4-DIAZOMETHYLKETONE

The acid chloride (3 g.) was added slowly to an ice-cold solution of diazomethane in ether (0.2 M, 300 ml.) and the solution was left at room temperature overnight. Ether and excess diazomethane was removed under reduced pressure and the red-brown residue was recrystallized from benzene-hexane to give 1.9 g. (57%) of fine yellow needles, M.P. 57–59°, with the expected infrared spectrum.

METHYL ISOTHIAZOL-4-YL-ACETATE

The diazoketone (1.9 g.), silver oxide (0.2 g.) and absolute methanol (25 ml.) were heated under reflux. Periodically small portions of silver oxide were added. The extent of the reaction was followed by the disappearance of the diazo band and the emergence of the ester carbonyl band in the infrared absorption spectrum of the mixture. After 3 hours the reaction was complete and the methanol was removed under reduced pressure. The residue was shaken with dry ether and filtered. The ether filtrate was washed with 2 N hydrocholric acid (10 ml.) and saturated aqueous sodium chloride (2 x 10 ml.). Next it was dried over magnesium sulfate with decolorizing charcoal. The mixture was filtered and the ether removed. A pale yellow oil (1.4 g.) with the expected infrared absorption spectrum was obtained.

ISOTHIAZOL-4-YL-ACETIC ACID

Methyl isothiazol-4-yl-acetate (1.4 g.) was dissolved in methanol (15 ml.) and a solution of 3 N sodium hydroxide in methanol (3.4 ml.) was added with swirling. The color of the solution went from yellow to dark red. The solution was left overnight at room temperature and then concentrated in vacuo to a thick red wax. Excess dry ether was added with scratching and the sodium salt separated as fine pink needles. These were filtered, washed with dry ether and dried by suction. The salt was dissolved in ice water (15 ml.) and acidified with concentrated hydrochloric acid (1 ml.). The mixture was saturated with salt and extracted with ethyl acetate (5 x 100 ml.). The dried (MgSO$_4$) ethyl acetate extracts were filtered and the solvent was removed. The residue was recrystallized from ethyl acetate-hexane and 1.2 g. (94%) yield of isothiazol-4-yl-acetic acid was obtained as white needles, M.P. 117–119° (dec.).

The structural assignment of this acid was confirmed by the neutralization equivalent, the infrared spectrum and the nuclear magnetic resonance aborption spectrum.

EXAMPLE 3

*Preparation of isothiazol-5-yl-acetic acid*

The synthesis of this compound is illustrated by the following scheme:

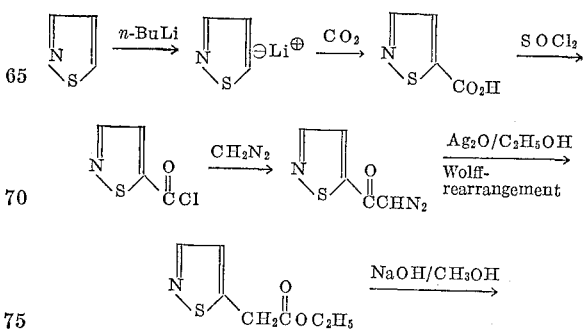

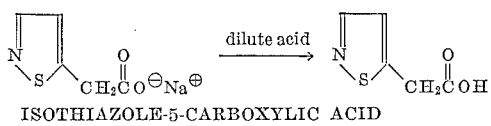

ISOTHIAZOLE-5-CARBOXYLIC ACID

This compound was prepared by reacting isothiazolyllithium with solid carbon dioxide, following the directions of Caton, Jones, Slack and Wooldridge, J. Chem. Soc., 446 (1964). The acid, M.P. 196–200° (dec.) was recrystallized from ethyl acetate and obtained in a 61% yield.

ISOTHIAZOLE-5-CARBONYL CHLORIDE

Isothiazole-5-carboxylic acid (11.8 g., 0.092 mole) and freshly distilled thionyl chloride (50 ml.) were heated under reflux for 1.5 hours. The excess thionyl chloride was removed on a rotary evaporator and the residue distilled in vacuo to give 10.8 g. (80%) of colorless liquid, B.P. 56–58° (5 mm.), with the expected infrared spectrum.

ISOTHIAZOLE-5-DIAZOMETHYLKETONE

A solution of isothiazole-5-carbonyl chloride (9.4 g., 0.064 mole) in 20 ml. of ether was added dropwise to 455 ml. of a 0.29 molar ethereal diazomethane solution (0.131 mole diazomethane) cooled in ice. A rapid reaction took place as was apparent by the rapid evolution of nitrogen and the color change of the ethereal solution from yellow to reddish-brown. After the addition of the acid chloride was completed (in approximately 30 minutes) the solution was allowed to come to room temperature in 30 minutes. Removal of the ether on a rotary evaporator left a reddish-brown solid residue, which was twice recrystallized from a benzene-petroleum ether mixture to 5.9 g. (60%) of colored crystals, M.P. 75–78°. The infrared spectrum contained a strong band at 2100 cm.$^{-1}$, characteristic for diazocarbonyl compounds.

ETHYL ISOTHIAZOL-5-YL-ACETATE

Isothiazole-5-diazomethylketone (5.7 g., 0.037 mole) and absolute ethanol (35 ml.) were heated under reflux, with magnetic stirring, in a 300 ml. round-bottom flask (the inside of which had been coated with a silver mirror). A small amount (approximately 0.3 g.) of freshly prepared silver oxide was added. This resulted in an immediate evolution of gas. This gas evolution ceased after 10–15 minutes and the addition of some more silver oxide was required. The extent of the reaction could be followed by the disappearance in the infrared spectrum of the diazo band at 2100 cm.$^{-1}$ and the appearance of an ester carbonyl band at 1740 cm.$^{-1}$. The reaction was completed after 2.5 hours heating under reflux, and a total amount of approximately 3.0 g. of silver oxide was added during this reflux period. The ethanol was removed on a rotary evaporator. Ether (100 ml.) was added to the residue and the suspended solid material was filtered off. The intensely red colored ether solution was washed with one N hydrochloric acid (30 ml.), whereafter it was dried over magnesium sulfate with some decolorizing carbon. The mixture was filtered and the ether removed on a rotary evaporator. The residue was distilled in vacuo to give 3.8 g. (60%) of colorless liquid, B.P. 95–96° (2 mm.), with the expected infrared spectrum.

ISOTHIAZOL-5-YL-ACETIC ACID

Eight ml. of 3 N methanolic sodium hydroxide was added to a solution of ethyl isothiazol-5-yl-acetate (3.3 g., 0.019 mole) in methanol (5 ml.). The solution became an intense red color and some heat was evolved. The mixture was left at room temperature for one hour during which the sodium salt of isothiazol-5-yl-acetic acid slowly crystallized from the solution. The remainder of the salt was precipitated by the addition of ether (75 ml.). The somewhat brownish colored salt was filtered off and amounted to 3.2 g. It was dissolved in water (25 ml.) followed by the addition of 3 N aqueous sulfuric acid (10 ml.). Isothiazol-5-yl-acetic acid precipitated immediately and was taken up in ethyl acetate (100 ml.). The aqueous layer was extracted with an additional amount of ethyl acetate (25 ml.). The combined ethyl acetate solutions were dried over magnesium sulfate with some decolorizing carbon. The mixture was filtered and the filtrate was concentrated on a rotary evaporator to a volume of approximately 50 ml., whereafter it was cooled in ice. The product, that crystallized readily from the solution, was collected by filtration. Yield: 2.1 g. (76%) of almost white crystals, M.P. 153–155° (dec.). The neutralization equivalent, the infrared spectrum and the nuclear magentic resonance spectrum fully agreed with the expected structure.

EXAMPLE 4

*Preparation of 4-chloroisothiazol-3-yl-acetic acid*

The synthesis of this acid is illustrated by the following reaction scheme:

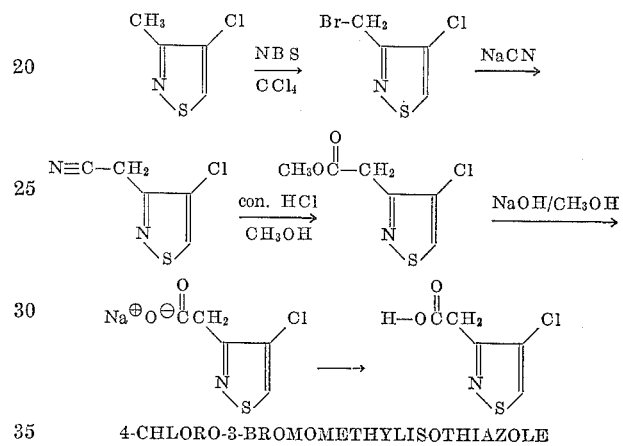

4-CHLORO-3-BROMOMETHYLISOTHIAZOLE 4-chloro-3-methylisothiazole (21.9 g., 0.164 mole), N-bromosuccinimide (29.2 g., 0.164 mole) and benzoyl peroxide (1 g.) in carbon tetrachloride (150 ml.) were heated under reflux with exposure to a 750 watt lamp for 10 hours. The succinimide was filtered off and the solvent removed under reduced pressure. The residue was dissolved in ether and washed with a 5% aqueous sodium bicarbonate solution. The residue obtained after drying and removal of the ether was fractionally distilled in vacuo. There was obtained 16.8 g. (48%) of 4-chloro-3-bromomethylisothiazole, B.P. 67–79° (0.5 mm.).

4-CHLORO-3-CYANOMETHYLISOTHIAZOLE

Sodium cyanide (5.6 g., 0.115 mole) was added in portions to a stirred mixture of 4-chloro-3-bromomethylisothiazole (16.7 g., 0.0785 mole) and dimethylsulfoxide (25 ml.). The exothermic reaction necessitated some cooling. When the mixture solidified almost completely, the remaining sodium cyanide was all added at once. An additional 10 ml. of dimethylsulfoxide was added and the mixture was heated in a water bath at 40–50° for 4 hours. The reaction mixture was poured into ice water (100 ml.) and the organic material was extracted with methylene chloride (3 x 50 ml.). The combined organic extracts were washed successively with 6 N hydrochloric acid (2×) and 5% aqueous sodium bicarbonate (1×). The methylene chloride solution was dried over magnesium sulfate wtih decolorizing carbon and filtered to give a red colored filtrate. The solvent was removed and the residue distilled in vacuo to give 6.4 g. of crude product, B.P. 95–107° (1 mm.). This partly solidified material was taken up in ether (10 ml.) followed by the addition of petroleum ether which caused a white solid to precipitate. The mixture was cooled and the solid collected by filtration; yield 3.9 g. (32%); M.P. 38–40°. The infrared spectrum agreed with the expected structure.

METHYL 4-CHLOROISOTHIAZOL-3-YL-ACETATE

A mixture of 4-chloro-3-cyanomethylisothiazole (3.5 g., 0.022 mole), methanol (25 ml.) and concentrated hydrochloric acid (15 ml.) was heated under reflux for 18 hours, whereafter most of the methanol was removed on a rotary evaporator. The organic material was taken up in methylene chloride and the aqueous layer once more extracted with some methylene chloride. The combined methylene chloride solutions were dried over magnesium sulfate with some decolorizing carbon, followed by filtration. The solvent was removed and the almost colorless liquid residue distilled in vacuo to give 2.7 g. (65%) of colorless liquid, B.P. 83–88° (0.5 mm.). The infrared spectrum agreed with the expected structure.

4-CHLOROISOTHIAZOL-3-YL-ACETIC ACID

Methyl 4-chloroisothiazol-3-yl-acetate (2.65 g., 0.0133 mole) was dissolved in methanol (6 ml.) and the resulting solution was treated with 3 N methanolic sodium hydroxide (7 ml.). The sodium salt of the required acid readily crystallized. The mixture was left at room temperature for one hour, then most of the methanol was removed and ether (75 ml.) was added to the residue. The sodium salt was filtered off and amounted to 2.35 g. (88%). The sodium salt (2.2 g., 0.011 mole) was dissolved in water (30 ml.) and this solution was acidified with 3 N aqueous sulfuric acid. The product slowly crystallized from the solution in fine white needles. The mixture was cooled and the crystals collected by filtration. The acid, M.P. 109–110.05°, was finally dried in vacuo over phosphorous pentoxide and amounted to 1.6 g. (72%, based on ester). The infrared spectrum, neutralization equivalent and nuclear magnetic resonance sectrum fully agreed with the expected structure.

EXAMPLE 5

*Preparation of 4-bromoisothiazol-3-yl-acetic acid*

4 - bromo - 3 - bromomethylisothiazole.—4 - bromo-3-methylisothiazole (19.9 g., 0.112 mole), N-bromosuccinimide (19.9 g., 0.112 mole) and benzoyl peroxide (1 g.) in carbon tetrachloride (500 ml.) were heated under reflux with exposure to a 750 watt lamp for 4.5 hours. The succinimide was filtered off, and the solvent removed under reduced pressure. The residue was dissolved in ether and washed with a 5% aqueous sodium bicarbonate solution. The residue obtained after drying and removal of the ether was fractionally distilled in vacuo. There was obtained 13.6 g. (48%) of 4-bromo-3-bromomethylisothiazole, B.P. 100–106° (3 mm.).

*4-bromo-3-cyanomethylisothiazole.*—4-bromo-3-bromomethylisothiazole (16.8 g., 0.654 mole) in dimethylsulfoxide (5 ml.) was added slowly to a stirred mixture of sodium cyanide (4 g., 0.0816 mole) and dimethylsulfoxide (20 ml.). The exothermic reaction necessitated some cooling. After one-half hour, the mixture was heated in a water bath at 40–50° for 3 hours. The reaction mixture was poured into ice-water (80 ml.), and the organic material was extracted with methylene chloride (3 x 50 ml.). The combined organic extracts were washed successively with 6 N hydrochloric acid (2×) and 5% aqueous sodium bicarbonate (1×). The methylene chloride solution was dried over magnesium sulfate with decolorizing carbon and filtered to give a red colored filtrate. The solvent was removed and the residue distilled in vacuo to give 3.55 g. of 4-bromo-3-cyanomethylisothiazole, B.P. 107–114° (0.5 mm.), which crystallized from benzene-hexane or ether-hexane as needles (32% yield), M.P. 47–49°. The infrared spectrum agreed with the expected structure.

*Methyl 4-bromoisothiazol-3-yl-acetate.*—A mixture of 4-bromo-3-cyanomethylisothiazole (3 g., 0.015 mole), methanol (10 ml.) and concentrated hydrochloric acid (10 ml.) was heated under reflux for 44 hours, whereafter most of the methanol was removed on a rotary evaporator. Ice-water (20 ml.) was added and the organic material was taken up in methylene chloride (4 x 10 ml.). The combined methylene chloride solutions were dried over magnesium sulfate with some decolorizing carbon, followed by filtration. The solvent was removed and 3.3 g. (96%) of colorless liquid was obtained. The infrared spectrum agreed with the expected structure.

*4-bromoisothiazol-3-yl-acetic acid.*—Methyl 4 - bromoisothiazol-3-yl-acetate (3.28 g., 0.0139 mole) was dissolved in methanol (5 ml.) and the resulting solution was treated with 3 N methanolic sodium hydroxide (5 ml.). The sodium salt of the required acid readily crystallized. The mixture was left at room temperature for one hour, then most of the methanol was removed and ether (75 ml.) was added to the residue. The sodium salt was filtered off and amounted to 2.47 g. The sodium salt (2.47 g., 0.0101 mole) was dissolved in water (10 ml.) and this solution was acidified with 6 N aqueous hydrochloric acid. The product slowly crystallized from the solution in fine white needles. The mixture was cooled and the crystals collected by filtration. The acid, M.P. 106–107°, was finally dried in vacuo over phosphorous pentoxide and amounted to 1.983 g. The infrared spectrum, neutralization equivalent and nuclear magnetic resonance spectrum fully agreed with the expected structure.

EXAMPLE 6

*Preparation of 3-methylisothiazol-4-yl-acetic acid*

3 - methylisothiazole-4-carbonyl chloride.—3 - methylisothiazole-4-carboxylic acid (7.0 g.) and thionyl chloride (30 ml.) were heated under reflux for 3 hours, whereafter the excess of thionyl chloride was removed under reduced pressure. Distillation of the residue in vacuo gave 4.5 g. (80%) of 3-methylisothiazole-4-carbonyl chloride, B.P. 64° (2 mm.).

*Methyl 3-methylisothiazol-4-yl-acetate.*—The 3-methylisothiazole-4-carbonyl chloride (4.5 g.) was added to an ice-cold solution of three equivalents of diazomethane in ether. The solution was allowed to stand overnight at room temperature. The ether was removed and methanol (275 ml.) and some silver oxide were added to the residue. The mixture was heated under reflux for 5 hours. Small amounts of silver oxide were added periodically to the refluxing mixture. The solution was filtered through "Celite," the methanol removed and the residue distilled in vacuo to give 3 g. methyl 3-methylisothiazol-4-yl-acetate (50%), B.P. 89–91° (1 mm.).

*3-methylisothiazol-4-yl-acetic acid.*—Methyl 3-methylisothiazol-4-yl-acetate (3.0 g.) was added to 3 N methanolic sodium hydroxide (10 ml.) with swirling. The solution was left overnight at room temperature and then concentrated on a rotary evaporator. The solution was then extracted with ether (3 x 25 ml.). The water solution was treated with charcoal, filtered through "Celite" and acidified with 3 M hydrochloric acid in an ice-water bath. The acid crystallized as a white powder and was filtered and dried in vacuo to give 2 g., M.P. 157–160°. Recrystallization from benzene gave 1.0 g. 3-methylisothiazol-4-yl-acetic acid, M.P. 159–161°. This compound had the expected neutralization equivalent, infrared spectrum and nuclear magnetic resonance spectrum.

EXAMPLE 7

*Preparation of 3-methylisothiazol-5-yl-acetic acid*

*3-methylisothiazole-5-carbonyl chloride.*—3-methylisothiazole-5-carboxylic acid (5.96 g.) and thionyl chloride (30 ml.) were heated under reflux for one and one-half hours, whereafter the excess of thionyl chloride was removed under reduced pressure. Distillation of the residue in vacuo gave 6.05 g. (93%) of 3-methylisothiazole-5-carbonyl chloride, B.P. 41–42° (0.5 mm.).

*3-methylisothiazole - 5 - diazomethylketone.*—The acid chloride (6.05 g.) was added slowly to an ice-cold solution of 3 equivalents of diazomethane in ether (0.24 M) and the solution was left at room temperature overnight. Ether and excess diazomethane were removed under reduced pressure and the red residue was washed with hexane, filtered and recrystallized from benzenehexane to give 3 g. of 3-methylisothiazole-5-diazomethylketone, M.P. 84–94°, with the expected infrared spectrum.

*Ethyl 3-methylisothiazol - 5 - yl-acetate.*—3-methylisothiazole-5-diazomethylketone (3.0 g., 0.018 mole) and absolute ethanol (50 ml.) were heated under reflux, with magnetic stirring, in a 300 ml. round-bottom flask (the inside of which had been coated with a silver mirror). A small amount (approximately 0.3 g.) of freshly prepared silver oxide was added. This resulted in an immediate evolution of gas. This gas evolution ceased after 10–15 minutes and the addition of some more silver oxide was required. The extent of the reaction could be followed by the disappearance in the infrared spectrum of the diazo band at 2100 cm.$^{-1}$ and the appearance of an ester carbonyl band at 1740 cm.$^{-1}$. The reaction was completed after 4 hours heating under reflux, and a total amount of approximately 3.0 g. of silver oxide was added during this reflux period. The ethanol was removed on a rotary evaporator. Ether (100 ml.) was added to the residue and the suspended solid material was filtered off. The ether solution was washed with 1 N hydrochloric acid (30 ml.), and salt water, whereafter it was dried over magnesium sulfate with some decolorizing carbon. The mixture was filtered and the ether removed on a rotary evaporator, to give 1.71 g. (51%) of ethyl 3-methylisothiazol-5-yl-acetate in the form of a red oil, with the expected infrared spectrum.

*3-methylisothiazol-5-yl-acetic acid.*—3 N methanolic sodium hydroxide (3.2 ml.) was added to ethyl 3-methylisothiazol-5-yl-acetate (1.71 g., 0.00925 mole). The solution was left overnight at room temperature and concentrated in vacuo. Dry ether was added and a thick oil and some solid separated; and the solid was filtered. Both the solid and oil were washed with ether, dissolved in water (20–25 ml.) and acidified with concentrated hydrochloric acid. A dark oil separated and was extracted with ethyl acetate (6 x 20 ml.). The combined ethyl acetate extracts were dried over magnesium sulfate with some decolorizing carbon. The mixture was filtered, and the filtrate was concentrated on a rotary evaporator. Recrystallization of the residue from ethyl acetate-hexane gave 0.751 g. 3-methylisothiazol-5-yl-acetic acid, M.P. 135–138° (dec.). The neutralization equivalent, infrared spectrum and nuclear magnetic resonance spectrum were in agreement with the expected structure.

EXAMPLE 8

When in the procedure of Example 6, 3-methylisothiazole-4-carboxylic acid is replaced by an equimolar amount of 4-methylisothiazole-3-carboxylic acid
5-methylisothiazole-3-carboxylic acid
4-methylisothiazole-5-carboxylic acid
3,4-dimethylisothiazole-5-carboxylic acid
4-chloro-3-methylisothiazole-5-carboxylic acid
4-iodo-3-methylisothiazole-5-carboxylic acid
4-bromo-3-methylisothiazole-5-carboxylic acid
5-methylisothiazole-4-carboxylic acid
3-chloroisothiazole-4-carboxylic acid
3-chloro-4-methylisothiazole-5-carboxylic acid
4-chloro-5-methylisothiazole-3-carboxylic acid and
3,5-dimethylisothiazole-4-carboxylic acid there are obtained 4-methylisothiazol-3-yl-acetic acid
5-methylisothiazol-3-yl-acetic acid
4-methylisothiazol-5-yl-acetic acid
3,4-dimethylisothiazol-5-yl-acetic acid
4-chloro-3-methylisothiazol-5-yl-acetic acid
4-iodo-3-methylisothiazol-5-yl-acetic acid
4-bromo-3-methylisothiazol-5-yl-acetic acid
5-methylisothiazol-4-yl-acetic acid
3-chloroisothiazol-4-yl-acetic acid
3-chloro-4-methylisothiazol-5-yl-acetic acid
4-chloro-5-methylisothiazol-3-yl-acetic acid and
3,5-dimethylisothiazol-4-yl-acetic acid respectively.

EXAMPLE 9

When in the procedure of Example 4, 4-chloro-3-methylisothiazole is replaced by an equimolar amount of 4-iodo-3-methylisothiazole
4-chloro-5-methylisothiazole
4-bromo-5-methylisothiazole
4-iodo-5-methylisothiazole
5-bromo-3-methylisothiazole
4,5-dibromo-3-methylisothiazole
3-chloro-5-methylisothiazole
3-bromo-5-methylisothiazole and
3,4-dichloro-5-methylisothiazole there are obtained 4-iodoisothiazol-3-yl-acetic acid
4-chloroisothiazol-5-yl-acetic acid
4-bromoisothiazol-5-yl-acetic acid
4-iodoisothiazol-5-yl-acetic acid
5-bromoisothiazol-3-yl-acetic acid
4,5-dibromoisothiazol-3-yl-acetic acid
3-chloroisothiazol-5-yl-acetic acid
3-bromoisothiazol-5-yl-acetic acid and
3,4-dichloroisothiazol-5-yl-acetic acid respectively.

EXAMPLE 10

*Preparation of 2,4-dinitrophenylisothiazol-5-yl-acetate*

Isothiazol-5-yl-acetic acid (0.477 g., 0.0033 mole) and 2,4-dinitrophenol (0.613 g., 0.0033 mole) were dissolved in dry dioxane (7 ml.) and the solution cooled in an ice bath. N,N'-dicyclohexylcarbodiimide (0.687 g., 0.0033 mole) was added and the solution shaken well and left at room temperature for 45 minutes. The precipitated urea was removed by filtration and washed with ethyl acetate (25 ml.). The filtrate and washings were combined, treated with charcoal and concentrated in vacuo at room temperature. The residue, 2,4-dinitrophenylisothiazol-5-yl-acetate was a wax and weighed 1.13 g.

EXAMPLE 11

*Preparation of potassium 7-(isothiazol-5-yl-acetamido) cephalosporanate*

7-aminocephalosporanic acid (0.544 g., 0.002 mole) and triethylamine (0.404 g., 0.004 mole) were shaken with methylene chloride (5 ml.) at room temperature until the mixture was homogeneous. The mixture was cooled in an ice bath and 2,4-dinitrophenylisothiazol-5-yl-acetate (0.68 g., 0.002 mole) was added with shaking and the resulting solution was left at room temperature for 18 hours for completion of the reaction. The reaction was followed by measuring the intensity of the amide absorption band at 1675 cm.$^{-1}$ in the infrared spectrum. The mixture was filtered and the triethylamine salt precipitated as an oil with ether (30 ml.). The oil was redissolved in methylene chloride (5 ml.) and reprecipitated with ether (30 ml.). The solvent was decanted and the oil dissolved in methanol (4 ml.) followed by addition of potassium 2-ethylhexanoate in n-butanol (2.5 M., 10 ml.). Addition of ether (30 ml.) precipitated potassium 7-(isothiazol-5-yl-acetamido)cephalosporanate. The precipitate was filtered, dissolved in methanol (10 ml.), reprecipitated with ether (50 ml.), filtered and dried in vacuo for 3 hours. Potassium 7-(isothiazol-5-yl-acetamido)cephalosporanate was obtained as a yellow colored solid and weighed 0.63 g.

The product, potassium 7-(isothiazol-5-yl-acetamido) cephalosporanate, was found to contain the β-lactam structure as shown by infrared analysis and to inhibit *Staph. aureus* Smith at 0.125 to 0.25 mcg./ml., to inhibit *Staph. aureus* BX–1633–2 at 0.8 to 1.6 mcg./ml., to inhibit *Salmonella enteritidis* at 1.6 mcg./ml. and to exhibit versus *Staph. aureus* Smith in mice a CD$_{50}$ of 1.8 mgm./kg. upon intramuscular injection and a CD$_{50}$ of 4.5 mgm./kg. upon oral administration and versus *Salmonella enteritidis* in mice a $CD_{50}$ of 140 mgm./kg. upon intramuscular injection.

EXAMPLE 12

*Preparation of 2,4-dinitrophenyl isothiazol-3-yl-acetate*

Isothiazol-3-yl-acetic acid (0.286 g., 0.002 mole) and 2,4-dinitrophenol (0.368 g., 0.002 mole) were dissolved in dry dioxane (10 ml.) and the solution cooled in an ice bath. N,N'-dicyclohexylcarbodiimide (0.413 g., 0.002 mole) was added and the solution shaken well and left at room temperature for 2 hours. The precipitated urea was removed by filtration and washed with dry dioxane followed by dry ether. The filtrate and washings were combined and concentrated in vacuo at room temperature. The residue, 2,4-dinitrophenyl isothiazol-3-yl-acetate, was an orange colored oil and weighed 0.65 g.

EXAMPLE 13

*Preparation of potassium 7-(isothiazol-3-yl-acetamido) cephalosporanate*

7-aminocephalosporanic acid (0.354 g., 0.0013 mole) and triethylamine (0.263 g., 0.004 mole) were shaken with methylene chloride (2 ml.) until the mixture was homogeneous. The mixture was cooled in an ice bath and 2,4-dinitroisothiazol-3-yl-acetate (0.41 g., 0.0013 mole) dissolved in methylene chloride (3 ml.) added with shaking and the resulting solution left at room temperature for 2 hours for completion of the reaction. The reaction was followed by measuring the intensity of the amide absorption band at 1675 cm.$^{-1}$ in the infrared spectrum. Dry ether was added and the triethylamine salt of 7-(isothiazol-3-yl-acetamido)cephalosporanic acid precipitated as an oil. The ether was decanted off and the oil dissolved in a minimum of methanol. Addition of a solution of potassium 2-ethylhexanoate in n-butanol (2.5 M., 0.52 ml.) followed by ether with scratching precipitated potassium 7-(isothiazol-3-yl-acetamido)cephalosporanate. The precipitate was collected by filtration and washed with ether, then dissolved in a minimum of methanol and reprecipitated with ether. After filtration the precipitate was washed with ether and dried in vacuo to give 0.424 g. potassium 7-(isothiazol-3-yl-acetamido)cephalosporanate as fine light yellow crystals.

The product, potassium 7-(isothiazol-3-yl-acetamido) cephalosporanate, was found to contain the β-lactam structure as shown by infrared analysis and to inhibit *Staph. aureus* Smith at 0.125 to 0.25 mcg./ml., to inhibit *Staph. aureus* BX–1633–2 (a strain resistant to benzylpenicillin) at 0.8 to 1.6 mcg./ml., to inhibit *Salmonella enteritidis* at 1.6 to 3.1 mcg./ml. and to exhibit versus *Staph. aureus* Smith in mice a $CD_{50}$ of 1.3 mgm./kg. upon intramuscular injection and a $CD_{50}$ of 2.0 mgm./kg. upon oral administration and versus *Salmonella enteritidis* in mice a $CD_{50}$ of 140 mgm./kg. upon intramuscular injection.

EXAMPLE 14

When in the procedure of Example 11 2,4-dinitrophenyl isothiazol-5-yl-acetate is replaced by an equimolar amount of the 2,4-dinitrophenyl ester of 4-methylisothiazol-3-yl-acetic acid,
4-methylisothiazol-5-yl-acetic acid,
3,4-dimethylisothiazol-5-yl-acetic acid,
3-chloroisothiazol-5-yl-acetic acid,
4-chloroisothiazol-5-yl-acetic acid,
3-bromo-isothiazol-5-yl-acetic acid,
4-bromo-isothiazol-5-yl-acetic acid,
3-chloro-4-methylisothiazol-5-yl-acetic acid,
3-chloroisothiazol-4-yl-acetic acid,
5-methylisothiazol-4-yl-acetic acid,
5-methylisothiazol-3-yl-acetic acid,
3,4-dichloroisothiazol-5-yl-acetic acid,
4-chloro-5-methylisothiazol-3-yl-acetic acid,
3,5-dimethylisothiazol-4-yl-acetic acid,
4-chloro-3-methylisothiazol-5-yl-acetic acid,
4-bromo-3-methylisothiazol-5-yl-acetic acid,
4-iodo-3-methylisothiazol-5-yl-acetic acid,
4-iodoisothiazol-5-yl-acetic acid,
4-iodoisothiazol-3-yl-acetic acid,
5-bromoisothiazol-3-yl-acetic acid,
4,5-dibromoisothiazol-3-yl-acetic acid,
isothiazol-4-yl-acetic acid,
4-chloroisothiazol-3-yl-acetic acid,
3-methylisothiazol-4-yl-acetic acid,
3-methylisothiazol-5-yl-acetic acid and
4-bromoisothiazol-3-yl-acetic acid, respectively there are obtained the potassium salts of 7-(4-methylisothiazol-3-yl-acetamido)cephalosporanic acid,
7-(4-methylisothiazol-5-yl-acetamido)cephalosporanic acid,
7-(3,4-dimethylisothiazol-5-yl-acetamido)cephalosporanic acid,
7-(3-chloroisothiazol-5-yl-acetamido)cephalosporanic acid,
7-(4-chloroisothiazol-5-yl-acetamido)cephalosporanic acid,
7-(3-bromo-isothiazol-5-yl-acetamido)cephalosporanic acid,
7-(4-bromo-isothiazol-5-yl-acetamido)cephalosporanic acid,
7-(3-chloro-4-methylisothiazol-5-yl-acetamido) cephalosporanic acid,
7-(3-chloroisothiazol-4-yl-acetamido)cephalosporanic acid,
7-(5-methylisothiazol-4-yl-acetamido)cephalosporanic acid,
7-(5-methylisothiazol-3-yl-acetamido)cephalosporanic acid,
7-(3,4-dichloroisothiazol-5-yl-acetamido) cephalosporanic acid,
7-(4-chloro-5-methylisothiazol-3-yl-acetamido) cephalosporanic acid,
7-(3,5-dimethylisothiazol-4-yl-acetamido) cephalosporanic acid,
7-(4-chloro-3-methylisothiazol-5-yl-acetamido) cephalosporanic acid,
7-(4-bromo-3-methylisothiazol-5-yl-acetamido) cephalosporanic acid,
7-(4-iodo-3-methylisothiazol-5-yl-acetamido) cephalosporanic acid,
7-(4-iodoisothiazol-5-yl-acetamido)cephalosporanic acid,
7-(4-iodoisothiazol-3-yl-acetamido)cephalosporanic acid,
7-(5-bromoisothiazol-3-yl-acetamido)cephalosporanic acid,
7-(4,5-dibromoisothiazol-3-yl-acetamido)cephalosporanic acid,
7-(isothiazol-4-yl-acetamido)cephalosporanic acid,
7-(4-chloroisothiazol-3-yl-acetamido)cephalosporanic acid,
7-(3-methylisothiazol-4-yl-acetamido)cephalosporanic acid,
7-(3-methylisothiazol-5-yl-acetamido)cephalosporanic acid and
7-(4-bromoisothiazol-3-yl-acetamido)cephalosporanic acid, respectively, each of which is isolated as its water-soluble potassium salt and found to contain the β-lactam structure as shown by infrared analysis and to inhibit *Staph. aureus* Smith at low concentrations.

EXAMPLE 15

Each of the products of Examples 11, 13 and 14 is dissolved in water and treated with an acetylesterase obtained from orange peels according to the procedure of Jansen et al., Arch. Biochem. 15, 415 (1947) at pH 6 for 15 hours. The solution is passed through a column containing IR 4B (a weak anionic ion exchange resin) in the acetate form and eluted with aqueous acetic acid (0.1 M.) which has been adjusted to pH 5.5 with pyridine. This solution is adjusted to pH 8 by addition of dilute sodium hydroxide and evaporated in vacuo to produce the following 3-hydroxymethyl-decephalosporanic acids in the form of their sodium salt.

3-hydroxymethyl-7-(isothiazol-5-yl-acetamido) decephalosporanic acid,
3-hydroxymethyl-7-(isothiazol-3-yl-acetamido) decephalosporanic acid,
3-hydroxymethyl-7-(4-methylisothiazol-3-yl-acetamido) decephalosporanic acid,
3-hydroxymethyl-7-(4-methylisothiazol-5-yl-acetamido) decephalosporanic acid,
3-hydroxymethyl-7-(3,4-dimethylisothiazol-5-yl-acetamido)decephalosporanic acid,
3-hydroxymethyl-7-(3-chloroisothiazol-5-yl-acetamido) decephalosporanic acid,
3-hydroxymethyl-7-(4-chloroisothiazol-5-yl-acetamido) decephalosporanic acid,
3-hydroxymethyl-7-(3-bromo-isothiazol-5-yl-acetamido) decephalosporanic acid,
3-hydroxymethyl-7-(4-bromo-isothiazol-5-yl-acetamido) decephalosporanic acid,
3-hydroxymethyl-7(3-chloro-4-methylisothiazol-5-yl-acetamido)decephalosporanic acid,
3-hydroxymethyl-7-(3-chloroisothiazol-4-yl-acetamido) decephalosporanic acid,
3-hydroxymethyl-7-(5-methylisothiazol-4-yl-acetamido) decephalosporanic acid,
3-hydroxymethyl-7-(5-methylisothiazol-3-yl-acetamido) decephalosporanic acid,
3-hydroxymethyl-7-(3,4-dichloroisothiazol-5-yl-acetamido)decephalosporanic acid,
3-hydroxymethyl-7-(4-chloro-5-methylisothiazol-3-yl-acetamido)decephalosporanic acid,
3-hydroxymethyl-7(3,5-dimethylisothiazol-4-yl-acetamido)decephalosporanic acid,
3-hydroxymethyl-7-(4-chloro-3-methylisothiazol-5-yl-acetamido)decephalosporanic acid,
3-hydroxymethyl-7-(4-bromo-3-methylisothiazol-5-yl-acetamido)decephalosporanic acid,
3-hydroxymethyl-7-(4-iodo-3-methylisothiazol-5-yl-acetamido)decephalosporanic acid,
3-hydroxymethyl-7-(4-iodoisothiazol-5-yl-acetamido) decephalosporanic acid,
3-hydroxymethyl-7-(4-iodoisothiazol-3-yl-acetamido) decephalosporanic acid,
3-hydroxymethyl-7-(5-bromoisothiazol-3-yl-acetamido) decephalosporanic acid,
3-hydroxymethyl-7-(4,5-dibromoisothiazol-3-yl-acetamido)decephalosporanic acid,
3-hydroxymethyl-7-(isothiazol-4-yl-acetamido) decephalosporanic acid,
3-hydroxymethyl-7-(4-chloroisothiazol-3-yl-acetamido) decephalosporanic acid,
3-hydroxymethyl-7-(3-methylisothiazol-4-yl-acetamido) decephalosporanic acid,
3-hydroxymethyl-7-(3-methylisothiazol-5-yl-acetamido) decephalosporanic acid and
3-hydroxymethyl-7-(4-bromoisothiazol-3-yl-acetamido) decephalosporanic acid, respectively, each of which is found to contain the β-lactam structure as shown by infrared analysis and to inhibit *Staph. aureus* Smith at low concentrations.

EXAMPLE 16

When in Examples 11, 13 and 14 7-aminocephalosporanic acid is replaced by an equimolar amount of 3-methyl-7-aminodecephalosporanic acid there are obtained the potassium salts of 3-methyl-7-(isothiazol-5-yl-acetamido)decephalosporanic acid,
3-methyl-7-(isothiazol-3-yl-acetamido)decephalosporanic acid,
3-methyl-7-(4-methylisothiazol-3-yl-acetamido) decephalosporanic acid,
3-methyl-7-(4-methylisothiazol-5-yl-acetamido) decephalosporanic acid,
3-methyl-7-(3,4-dimethylisothiazol-5-yl-acetamido) decephalosporanic acid,
3-methyl-7(3-chloroisothiazol-5-yl-acetamido) decephalosporanic acid,
3-methyl-7-(4-chloroisothiazol-5-yl-acetamido) decephalosporanic acid,
3-methyl-7-(3-bromo-isothiazol-5-yl-acetamido) decephalosporanic acid,
3-methyl-7-(4-bromo-isothiazol-5-yl-acetamido) decephalosporanic acid,
3-methyl-7-(3-chloro-4-methylisothiazol-5-yl-acetamido) decephalosporanic acid,
3-methyl-7-(3-chloroisothiazol-4-yl-acetamido) decephalosporanic acid,
3-methyl-7-(5-methylisothiazol-4-yl-acetamido) decephalosporanic acid,
3-methyl-7-(5-methylisothiazol-3-yl-acetamido) decephalosporanic acid,
3-methyl-7-(3,4-dichloroisothiazol-5-yl-acetamido) decephalosporanic acid,
3-methyl-7-(4-chloro-5-methylisothiazol-3-yl-acetamido) decephalosporanic acid,
3-methyl-7-(3,5-dimethylisothiazol-4-yl-acetamido)- decephalosporanic acid,
3-methyl-7-(4-chloro-3-methylisothiazol-5-yl-acetamido)- decephalosporanic acid,
3-methyl-7-(4-bromo-3-methylisothiazol-5-yl-acetamido)- decephalosporanic acid,
3-methyl-7-(4-iodo-3-methylisothiazol-5-yl-acetamido)- decephalosporanic acid,
3-methyl-7-(4-iodoisothiazol-5-yl-acetamido)decephalosporanic acid,
3-methyl-7-(4-iodoisothiazol-3-yl-acetamido)decephalosporanic acid,
3-methyl-7-(5-bromoisothiazol-3-yl-acetamido)decephalosporanic acid,
3-methyl-7-(4,5-dibromoisothiazol-3-yl-acetamido)decephalosporanic acid,
3-methyl-7-(isothiazol-4-yl-acetamido)decephalosporanic acid,
3-methyl-7-(4-chloroisothiazol-3-yl-acetamido)decephalosporanic acid,
3-methyl-7-(3-methylisothiazol-4-yl-acetamido)decephalosporanic acid,
3-methyl-7-(3-methylisothiazol-5-yl-acetamido)decephalosporanic acid and
3-methyl-7-(4-bromoisothiazol-3-yl-acetamido)decephalosporanic acid, respectively, each of which is isolated as its water-soluble potassium salt and found to contain the β-lactam structure as shown by infrared analysis and to inhibit *Staph. aureus* Smith at low concentrations.

EXAMPLE 17

3-hydroxymethyl-7-aminodecephalosporanic acid lactone (0.002 mole) is shaken with methylene chloride at room temperature until the mixture is homogeneous. The mixture is cooled in an ice bath and 2,4-dinitrophenyl isothiazol-5-yl-acetate (0.002 mole) is added with shaking and the resulting solution left at room temperature for completion of the reaction. The reaction is followed by measuring the intensity of the amide absorption band at 1675 cm.$^{-1}$ in the infrared spectrum. The mixture is filtered and addition of ether precipitates 3-hydroxymethyl-7-(isothiazol-5-yl-acetamido)decephalosporanic acid lactone. The product is dissolved in methylene chloride and reprecipitated with ether and dried.

Substitution of an equimolar amount of 2,4-dinitrophenylisothiazol-3-yl-acetate and the 2,4-dinitrophenylester of each of the acetic acids in Example 14 for 2,4-dinitrophenyl-isothiazol-5-yl-acetate gives the following products:

3-hydroxymethyl-7-(isothiazol-3-yl-acetamido)decephalosporanic acid lactone,
3-hydroxymethyl-7-(4-methylisothiazol-3-yl-acetamido)-decephalosporanic acid lactone,
3-hydroxymethyl-7-(4-methylisothiazol-5-yl-acetamido)-decephalosporanic acid lactone,
3-hydroxymethyl-7-(3,4-dimethylisothiazol-5-yl-acetamido)decephalosporanic acid lactone,
3-hydroxymethyl-7-(3-chloroisothiazol-5-yl-acetamido)-decephalosporanic acid lactone,
3-hydroxymethyl-7-(4-chloroisothiazol-5-yl-acetamido)-decephalosporanic acid lactone,
3-hydroxymethyl-7-(3-bromo-isothiazol-5-yl-acetamido)-decephalosporanic acid lactone,
3-hydroxymethyl-7-(4-bromo-isothiazol-5-yl-acetamido)-decephalosporanic acid lactone,
3-hydroxymethyl-7-(3-chloro-4-methylisothiazol-5-yl-acetamido)-decephalosporanic acid lactone,
3-hydroxymethyl-7-(3-chloroisothiazol-4-yl-acetamido)-decephalosporanic acid lactone,
3-hydroxymethyl-7-(5-methylisothiazol-4-yl-acetamido)-decephalosporanic acid lactone,
3-hydroxymethyl-7-(5-methylisothiazol-3-yl-acetamido)-decephalosporanic acid lactone,
3-hydroxymethyl-7-(3,4-dichloroisothiazol-5-yl-acetamido)decephalosporanic acid lactone,
3-hydroxymethyl-7-(4-chloro-5-methylisothiazol-3-yl-acetamido)decephalosporanic acid lactone,
3-hydroxymethyl-7-(3,5-dimethylisothiazol-4-yl-acetamido)decephalosporanic acid lactone,
3-hydroxymethyl-7-(4-chloro-3-methylisothiazol-5-yl-acetamido)decephalosporanic acid lactone,
3-hydroxymethyl-7-(4-bromo-3-methylisothiazol-5-yl-acetamido)decephalosporanic acid lactone,
3-hydroxymethyl-7-(4-iodo-3-methylisothiazol-5-yl-acetamido)decephalosporanic acid lactone,
3-hydroxymethyl-7-(4-isodoisothiazol-5-yl-acetamido)-decephalosporanic acid lactone,
3-hydroxymethyl-7-(4-iodoisothiazol-3-yl-acetamido)-decephalosporanic acid lactone,
3-hydroxymethyl-7-(5-bromoisothiazol-3-yl-acetamido)-decephalosporanic acid lactone,
3-hydroxymethyl-7-(4,5-dibromoisothiazol-3-yl-acetamido)decephalosporanic acid lactone,
3-hydroxymethyl-7-(isothiazol-4-yl-acetamido)decephalosporanic acid lactone,
3-hydroxymethyl-7-(4-chloroisothiazol-3-yl-acetamido)-decephalosporanic acid lactone,
3-hydroxymethyl-7-(3-methylisothiazol-4-yl-acetamido)-decephalosporanic acid lactone,
3-hydroxymethyl-7-(3-methylisothiazol-5-yl-acetamido)-decephalosporanic acid lactone and
3-hydroxymethyl-7-(4-bromoisothiazol-3-yl-acetamido)-decephalosporanic acid lactone.

Each of the foregoing products is found to contain the β-lactam structure as shown by infrared analysis and to inhibit *Staph. aureus* Smith at low concentrations.

EXAMPLE 18

3-pyridiniummethyl-7-aminodecephalosporanic acid inner salt (0.002 mole) is shaken with methylene chloride at room temperature until the mixture is homogeneous. The mixture is cooled in an ice bath and 2,4-dinitrophenylisothiazol-5-yl-acetate (0.002 mole) is added with shaking and the resulting solution left at room temperature for completion of the reaction. The reaction is followed by measuring the intensity of the amide absorption band at 1675 cm.$^{-1}$ in the infrared spectrum. The mixture is filtered and addition of ether precipitates 3-pyridiniummethyl-7-(isothiazol-5-yl-acetamido) decephalosporanic acid inner salt. The product is dissolved in methylene chloride and reprecipitated with ether and dried.

Substitution of an equimolar amount of 2,4-dinitrophenylisothiazol-3-yl-acetate and the 2,4-dinitrophenyl ester of each of the acetic acids in Example 14 for 2,4-dinitrophenylisothiazol-5-yl-acetate gives the following products:

3-pyridiniummethyl-7-(isothiazol-3-yl-acetamido) decephalosporanic acid inner salt,
3-pyridiniummethyl-7-(4-methylisothiazol-3-yl-acetamido)decephalosporanic acid inner salt,
3-pyridiniummethyl-7-(4-methylisothiazol-5-yl-acetamido)decephalosporanic acid inner salt,
3-pyridiniummethyl-7-(3,4-dimethylisothiazol-5-yl-acetamido)decephalosporanic acid inner salt,
3-pyridiniummethyl-7-(3-chloroisothiazol-5-yl-acetamido)decephalosporanic acid inner salt,
3-pyridiniummethyl-7-(4-chloroisothiazol-5-yl-acetamido)decephalosporanic acid inner salt,
3-pyridiniummethyl-7-(3-bromo-isothiazol-5-yl-acetamido)decephalosporanic acid inner salt,
3-pyridiniummethyl-7-(4-bromo-isothiazol-5-yl-acetamido)decephalosporanic acid inner salt,
3-pyridiniummethyl-7-(3-chloro-4-methylisothiazol-5-yl-acetamido)decephalosporanic acid inner salt,
3-pyridiniummethyl-7-(3-chloroisothiazol-4-yl-acetamido)decephalosporanic acid inner salt,
3-pyridiniummethyl-7-(5-methylisothiazol-4-yl-acetamido)decephalosporanic acid inner salt,
3-pyridiniummethyl-7-(5-methylisothiazol-3-yl-acetamido)decephalosporanic acid inner salt,
3-pyridiniummethyl-7-(3,4-dichloroisothiazol-5-yl-acetamido)decephalosporanic acid inner salt,
3-pyridiniummethyl-7-(4-chloro-5-methylisothiazol-3-yl-acetamido)decephalosporanic acid inner salt,
3-pyridiniummethyl-7-(3,4-dichloroisothiazol-5-yl-acetamido)decephalosporanic acid inner salt,
3-pyridiniummethyl-7-(4-chloro-3-methylisothiazol-5-yl-acetamido)decephalosporanic acid inner salt,
3-pyridiniummethyl-7-(4-bromo-3-methylisothiazol-5-yl-acetamido)decephalosporanic acid inner salt,
3-pyridiniummethyl-7-(4-iodo-3-methylisothiazol-5-yl-acetamido)decephalosporanic acid inner salt,
3-pyridiniummethyl-7-(4-iodoisothiazol-5-yl-acetamido)decephalosporanic acid inner salt,
3-pyridiniummethyl-7-(4-iodoisothiazol-3-yl-acetamido)decephalosporanic acid inner salt,
3-pyridiniummethyl-7-(5-bromoisothiazol-3-yl-acetamido)decephalosporanic acid inner salt,
3-pyridiniummethyl-7-(4,5-dibromoisothiazol-3-yl-acetamido)decephalosporanic acid inner salt,
3-pyridiniummethyl-7-(isothiazol-4-yl-acetamido)decephalosporanic acid inner salt,
3-pyridiniummethyl-7-(4-chloroisothiazol-3-yl-acetamido)decephalosporanic acid inner salt,
3-pyridiniummethyl-7-(3-methylisothiazol-4-yl-acetamido)decephalosporanic acid inner salt,
3-pyridiniummethyl-7-(3-methylisothiazol-5-yl-acetamido)decephalosporanic acid inner salt, and
3-pyridiniummethyl-7-(4-bromoisothiazol-3-yl-acetamido)decephalosporanic acid inner salt.

Each of the foregoing products is found to contain the β-lactam structure as shown by infrared analysis and to inhibit *Staph. aureus* Smith at low concentrations.

EXAMPLE 19

Substitution of an equimolar amount of 3-quinoliniummethyl-7-aminodecephalosporanic acid inner salt for 3-pyridiniummethyl - 7 - aminodecephalosporanic acid inner salt in Example 18 gives 3-quinoliniummethyl - 7 - (isothiazol-5-yl-acetamido)decephalosporanic acid inner salt.

EXAMPLE 20

Substitution of an equimolar amount of 3-γ-picoliniummethyl - 7 - aminodecephalosporanic acid inner salt for 3- pyridiniummethyl - 7 - aminodecephalosporanic acid inner salt in Example 18 gives 3 - γ - picoliniummethyl - 7 - (isothiazol-5-yl-acetamido)decephalosporanic acid inner salt.

EXAMPLE 21

When each of the following chlorides propionyl chloride
butanoyl chloride
pentanoyl chloride and
benzoyl chloride is added to 3-hydroxymethyl - 7 - (isothiazol-5-yl-acetamido)decephalosporanic acid in collidine there are obtained 3-propionyloxymethyl-7-(isothiazol-5-yl-acetamido)decephalosporanic acid,
3-butanoyloxymethyl-7-isothiazol-5-yl-acetamido)decephalosporanic acid,
3-pentanoyloxymethyl-7-(isothiazol-5-yl-acetamido)decephalosporanic acid, and
3-benzoyloxymethyl-7-(isothiazol-5-yl-acetamido)decephalosporanic acid.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

What is claimed is:

1. A compound having the formula

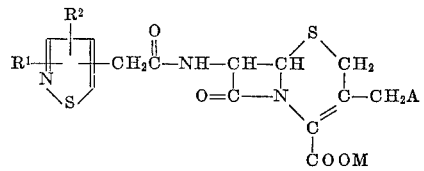

wherein
A is a member selected from the group consisting of hydrogen, hydroxyl, (lower)alkanoyloxy, benzoyloxy, a quaternary ammonium radical and when taken together with M, a monovalent carbon-oxygen bond;
M is a member selected from the group consisting of hydrogen, a pharmaceutically acceptable nontoxic cation, an anionic charge when A is a quaternary ammonium radical and when taken together with A, a monovalent carbon-oxygen bond;
$R^1$ and $R^2$ each represent a member selected from the group consisting of hydrogen, chloro, bromo, iodo and methyl.

2. A compound having the formula

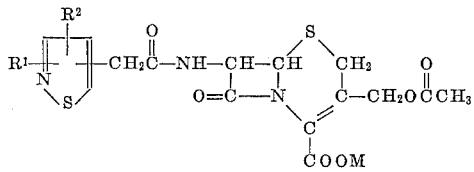

wherein
M is a pharmaceutically acceptable nontoxic cation;
$R^1$ and $R^2$ each represent a member selected from the group consisting of hydrogen, chloro, bromo, iodo and methyl.

3. A compound having the formula

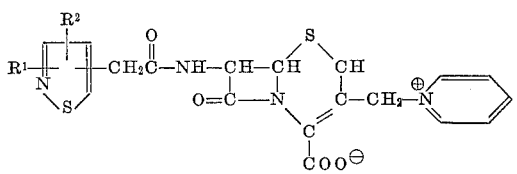

wherein
$R^1$ and $R^2$ each represent a member selected from the group consisting of hydrogen, chloro, bromo, iodo and methyl.

4. A compound having the formula

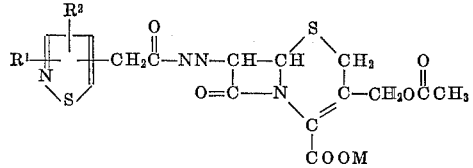

wherein
M is a pharmaceutically acceptable nontoxic cation;
$R^1$ and $R^2$ each represent a member selected from the group consisting of hydrogen and methyl.

5. A compound having the formula

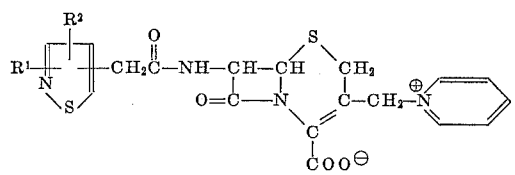

wherein
$R^1$ and $R^2$ each represent a member selected from the group consisting of hydrogen and methyl.

6. A compound having the formula

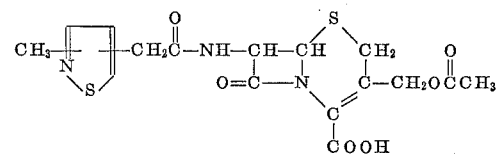

7. A compound having the formula

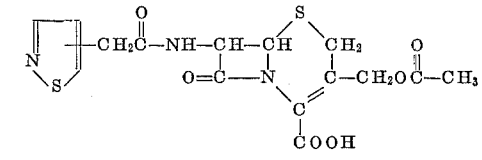

8. A compound having the formula

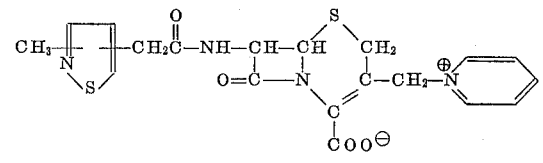

9. A compound having the formula

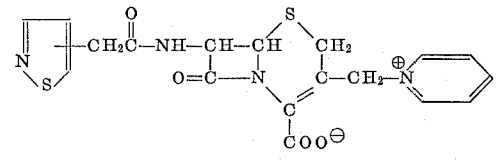

10. 7-(isothiazol-3-yl-acetamido)cephalosporanic acid.
11. 7-(isothiazol-5-yl-acetamido)cephalosporanic acid.
12. 7-(isothiazol-4-yl-acetamido)cephalosporanic acid.
13. 7-(3 - methyl - isothiazol-5-yl - acetamido)cephalosporanic acid.
14. 3-methyl-7-(isothiazol - 5 - yl-acetamido)-decephalosporanic acid.

15. 3-hydroxymethyl-7-(isothiazol - 5 - yl - acetamido)decephalosporanic acid.

16. 3-pyridiniummethyl-7-(isothiazol-5-yl - acetamido)decephalosporanic acid inner salt.

17. 3-pyridiniummethyl-7-(isothiazol-4-yl - acetamido)decephalosporanic acid inner salt.

18. 3-pyridiniummethyl-7-(isothiazol-3-yl - acetamido)decephalosporanic acid inner salt.

19. 3-pyridiniummethyl - 7 - (3 - methylisothiazol-5-yl-acetamido)decephalosporanic acid inner salt.

20. 3-hydroxymethyl-7-(isothiazol - 5 - yl - acetamido)decephalosporanic acid lactone.

References Cited by the Examiner

UNITED STATES PATENTS 3,218,318  11/1965  Flynn _____ 260—243

HENRY R. JILES, *Acting Primary Examiner.*

J. W. ADAMS, *Examiner.*